March 29, 1966  T. P. SIMOVICH  3,243,198
TRUNNION SUSPENSION
Filed May 28, 1962
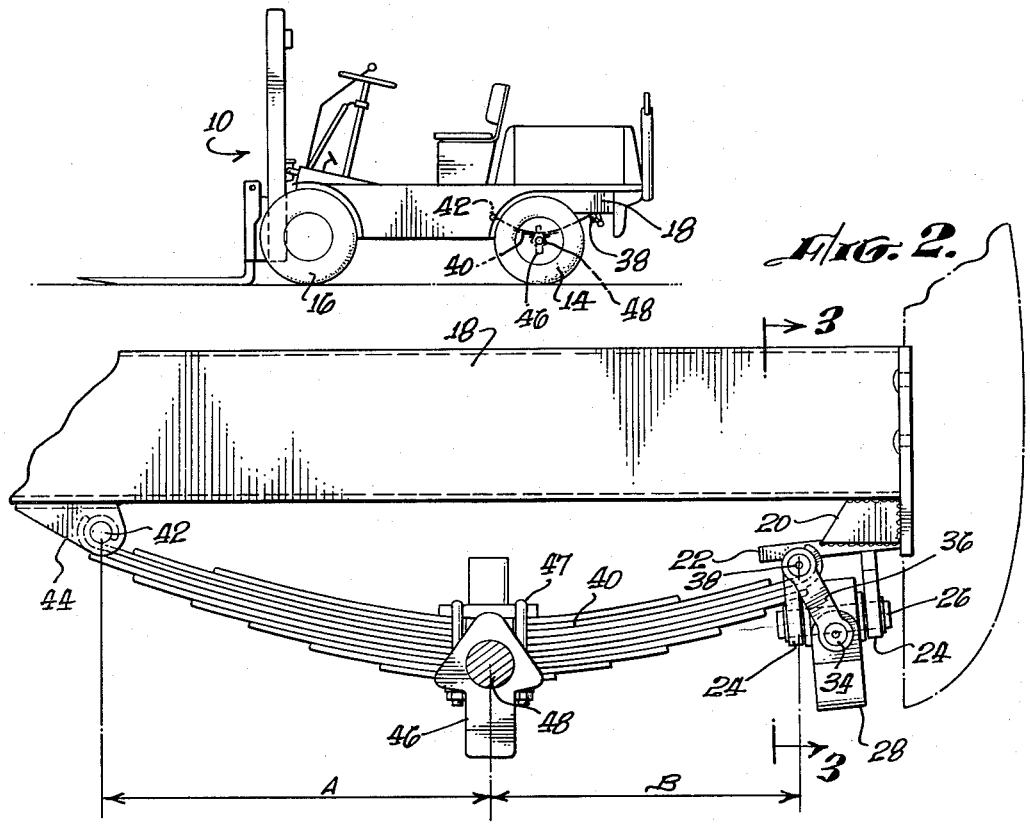
Tom P. Simovich,
INVENTOR.
BY HIS ATTORNEYS.
Harris, Kiech, Russell & Kern.

United States Patent Office 3,243,198
Patented Mar. 29, 1966

3,243,198
TRUNNION SUSPENSION
Tom P. Simovich, Arcadia, Calif., assignor to Champ Corporation, El Monte, Calif., a corporation of California
Filed May 28, 1962, Ser. No. 198,018
2 Claims. (Cl. 280—112)

The present invention relates generally to the vehicle art and more particularly to a novel trunnion suspension which is especially applicable for use with lift trucks and the like.

Briefly stated, one embodiment of the present invention as used with a lift truck or the like containing a frame, includes a rigid trunnion yoke pivotally mounted beneath the frame so as to extend transversely thereof, longitudinally extending leaf springs adjacent each side of the frame, one end of each of the springs being connected to one end of the yoke and the other end thereof being fastened to the frame at a position spaced from the yoke support, and an axle member fastened to the springs intermediate the ends thereof, whereby the wheels mounted on the axle have an increased vertical movement due to the flexing of the leaf spring and the vertical movement of the ends of the pivotally mounted trunnion yoke.

As is well known in this art, lift trucks which formerly were used primarily in only one location, e.g., a warehouse or loading dock, are now being towed or driven from one job site to another.

One example of the usage of lift trucks in various locations is the delivery and unloading of brick and concrete blocks. With such products it is commonplace to tow the lift truck in back of the carrier or tractor-trailer carrying the bricks or blocks on pallets so that these products can be quickly and easily unloaded by the driver at the job site with a minimum amount of effort and time. In other types of material handling, however, it is often necessary to drive the lift truck from one job site to another, as where products or material already on the job have to be moved around or lifted from the ground level to an elevated position.

Obviously, driving or towing a lift truck over streets and along highways presents more of a problem insofar as the suspension system is concerned than when such trucks are used on smooth concrete floors or aprons as in warehouses and at loading docks.

It is an object of the present invention, therefore, to provide a novel trunnion suspension which is particularly suitable for use with lift trucks and which permits them to be freely towed or driven from one job site to another with a minimum amount of discomfort to the driver or damage to the vehicle.

A further object is to provide a novel trunnion suspension which will provide for greater relative vertical movement between the rear wheels and the driving wheels of a lift truck. More particularly, it is an object to provide such a suspension system which will provide a maximum amount of vertical movement of the rear wheels relative to the supporting frame or to the front or driving wheels so that the latter will not be moved out of driving contact with the roadway when the rear wheels ride over an obstacle or down through a depression. Specifically, it is an object to provide such a suspension system which includes leaf springs, but which will permit greater relative vertical movement of the rear wheels than can be accomplished with a conventional leaf spring construction, without oscillations of the rear wheels.

Another object is to provide a novel trunnion suspension which will provide a maximum amount of resiliency or cushioning for the rear wheel suspension without unduly weakening or limiting the load-carrying capacity of the vehicle. More particularly, it is an object to provide such a suspension system employing leaf springs wherein the latter are also subjected to a torsion or twisting action to provide an increased amount of yieldable support compared to a conventional flexing type of support normally provided by leaf springs.

Further objects and advantages of the present invention will be apparent from the following detailed description, reference being had to the accompanying drawing wherein a preferred embodiment of the present invention is shown.

In the drawings:

FIG. 1 is a side elevational view of a lift truck provided with a novel trunnion suspension embodying the teachings of the present invention;

FIG. 2 is an enlarged fragmentary longitudinal vertical sectional view at the rear portion of the vehicle, the view being taken inwardly of the near rear wheel to better illustrate the leaf spring construction; and FIG. 3 is a vertical sectional view taken on the line 3—3 in FIG. 2.

Referring to the drawing more particularly by reference numerals, 10 indicates generally a lift truck provided with a novel trunnion suspension constructed in accordance with the teachings of the present invention, the lift truck also including a set of rear wheels 14, a set of front wheels 16, and a supporting frame 18 of conventional construction.

Depending from the rear end of the supporting frame 18 (FIGS. 2 and 3) is a rear bracket member 20 which supports a substantially horizontally extending plate 22 having two spaced-apart flange elements 24 extending downwardly therefrom, the latter supporting a short trunnion shaft 26 therebetween.

Pivotally mounted on the trunnion shaft 26 is a rigid trunnion yoke member 28 which has opposed vertically extending end portions 30. Transversely extending passageways 32 are provided in the end portions 30 for rotatably receiving pins 34, each of which has one end of a pair of links 36 fastened thereto, the other ends of the links 36 receiving a rear spring pin 38.

On each side of the frame of the vehicle is a longitudinally extending spring member 40 which is preferably of leaf spring type construction and which has one end thereof mounted on the rear spring pin 38. The other end of each of the leaf springs 40 is fastened to a front spring pin 42 which is supported by a front bracket 44 depending from the frame 18 at a position spaced forwardly of the bracket 20.

Fastened to the leaf springs 40 intermediate the ends thereof as by U-bolts 47 is an axle beam 46 which includes wheel spindles 48 for rotatably supporting the rear wheels.

The horizontal distance between the front spring pin 42 and the center line of the axle beam 48 is identified by the letter "A" and the horizontal distance between the center line of the axle beam and the rear spring pin 38 is identified by the letter "B." As will be described more fully hereinafter, the distance A is greater than the distance B and the ratio of said distances is selected to provide the optimum amount of spring torque and deflection without sacrificing the load-carrying capacity of the vehicle.

It will be noted from a consideration of the subject construction, particularly as shown in FIG. 3, that the pivotally mounted trunnion yoke 28 provides an increased amount of vertical movement of the ends of the wheel spindles 48 because the rear spring pins 38 are free to move vertically with the ends of the trunnion yoke instead of being fixed to the frame, as in a conventional construction. In short, vertical movement is provided by both the normal flexing action of the leaf springs and the movement of the rear spring pins 38. As indicated in FIG. 2, the rear spring pins 38 have limited angular movement relative to the ends of the trunnion yoke 28 by reason of the links 36 so that there is no twisting of the trunnion yoke 28 as when the axle beam 46 moves in the vertical direction so as to vary the horizontal distance between the front pin 42 and the rear pin 38. As a result of the double action provided by the pivotally mounted trunnion yoke, a lift truck containing this type of trunnion suspension can ride over relatively rough terrain without tilting the supporting framework or causing the driving wheels 16 to be lifted from the road surface and thereby reduce the traction thereof.

The rigid trunnion yoke also has the further advantage in that it provides for increased relative vertical movement between the rear wheels 14 but at the same time prevents them from oscillating or "jumping" as would occur if the yoke were flexible.

It will also be noted that due to this particular construction, when the trunnion yoke 28 is pivoted, each leaf spring 40 is subjected to a twisting or torsion movement as well as a flexing movement. Also, most of this twisting occurs between the axle beam 46 and the front spring pin 42 because the rear spring pin 38 pivots downwardly with the end of the trunnion yoke and with the wheel spindle 48, whereas the front spring pin 42 remains stationary and maintains the front end of the leaf spring 40 in the same horizontal position relative to the supporting frame 18. Consequently, when the axle beam 46 is moved rearwardly relative to the center of the leaf spring whereby the distance A is greater than the distance B, the permissive angular deflection or torsion movement of the front portion of the leaf spring is increased with no increase in stress in the spring. From a practical standpoint, this means a smoother or more resilient ride with no increase in spring breakage through metal fatigue. Thus, a leaf spring of predetermined flexibility or resiliency (and a predetermined load-supporting ability) can provide a smoother ride if the axle beam 46 is shifted in the rearward direction so as to increase the ratio of $A:B$ to a number greater than unity. Obviously, if the axle beam 46 were moved too far rearward so as to be adjacent the rear spring pin 38 there would be substantially no conventional flexing support and only a torsion type of support. Therefore, the axle beam 46 is positioned intermediate the rear spring pin 38 and the midpoint of the leaf spring 40 so as to provide the optimum resilient load support without increasing spring breakage through metal fatigue.

Thus, it is apparent that there has been provided a novel trunnion suspension which fulfills all of the objects and advantages sought therefor. Because of the increased vertical movement of the rear ends of the springs by reason of the pivotally mounted trunnion yoke, there is an increased vertical movement of the rear wheels to thereby increase the "roadability" of the vehicle and permit it to be freely towed or driven from one job site to another. Furthermore, the rearward position of the axle beam relative to the center of the leaf springs provides for an increased twisting or torsional support so as to further increase the resiliency of the spring without detracting from the load-supporting ability and without increasing breakage through metal fatigue.

It is to be understood that the foregoing description and the accompanying drawing have been given only by way of illustration and example and that changes and alterations in the present disclosure which will be readily apparent to one skilled in the art are contemplated as within the scope of the present invention.

I claim:
1. The combination of:
   a vehicle including a frame having opposed ends;
   a rigid trunnion yoke pivotally mounted under the frame adjacent one end thereof and extending transversely of the frame, the trunnion yoke having opposed ends;
   opposed, spaced-apart leaf springs extending longitudinally of the frame adjacent the sides thereof, one end of each leaf spring being fastened to one end of the trunnion yoke and the other end thereof being fastened to the frame at a positioned spaced longitudinally of the trunnion yoke, the fastening at the frame preventing transverse pivotal movement of said other end of the spring relative to that frame; and
   a transversely extending axle member fastened to the leaf springs intermediate the ends thereof, the distance of the axle from the frame end of the spring being greater than the distance thereof from the trunnion yoke end of the spring to provide a predetermined amount of torsional support relative to the flexing support thereof to increase the effective resiliency of the spring without adversely affecting the resistance thereof to breakage from metal fatigue.
2. The combination of:
   a vehicle including a frame having opposed ends;
   a rigid trunnion yoke pivotally mounted under the frame adjacent one end thereof and extending transversely of the frame, the trunnion yoke having opposed ends;
   opposed, spaced-apart leaf springs extending longitudinally of the frame adjacent the sides thereof, one end of each leaf spring being fastened to one end of the trunnion yoke and the other end thereof being fastened to the frame at a position spaced longitudinally of the yoke the fastening at the frame preventing transverse pivotal movement of said other end of the spring relative to the frame; and
   a transversely extending axle member fastened to the leaf springs intermediate the ends thereof, the ratio of the distance between the axle and the frame end of the spring to the distance between the axle and the yoke end of the spring being other than unity and being selected to provide the desired torsional support of the trunnion member relative to the frame end of the spring.

References Cited by the Examiner
UNITED STATES PATENTS

| | | | |
|---|---|---|---|
| 1,508,487 | 9/1924 | Timmons | 267—46 |
| 1,745,431 | 2/1930 | Marcum | 267—46 X |
| 1,890,892 | 12/1932 | Aflague | 267—11 |
| 2,002,459 | 5/1935 | Viviano | 280—112 X |
| 2,477,789 | 8/1949 | Dunham | 280—112 X |
| 2,491,283 | 12/1949 | Shoenrock | 280—112 X |

OTHER REFERENCES

Manual on Design and Application of Leaf Spring-SAE J788: Report of Spring Committee approved June 1944 and last revised February 1962; TJ210/S6m, 1962; pages 88–98.

A. HARRY LEVY, *Primary Examiner.*

LEO FRIAGLIA, *Examiner.*

BENJAMIN HERSH, W. A. MARCONTELL,
*Assistant Examiners.*